No. 735,529. PATENTED AUG. 4, 1903.
O. C. KNIPE.
BALL BEARING.
APPLICATION FILED SEPT. 22, 1900.
NO MODEL.
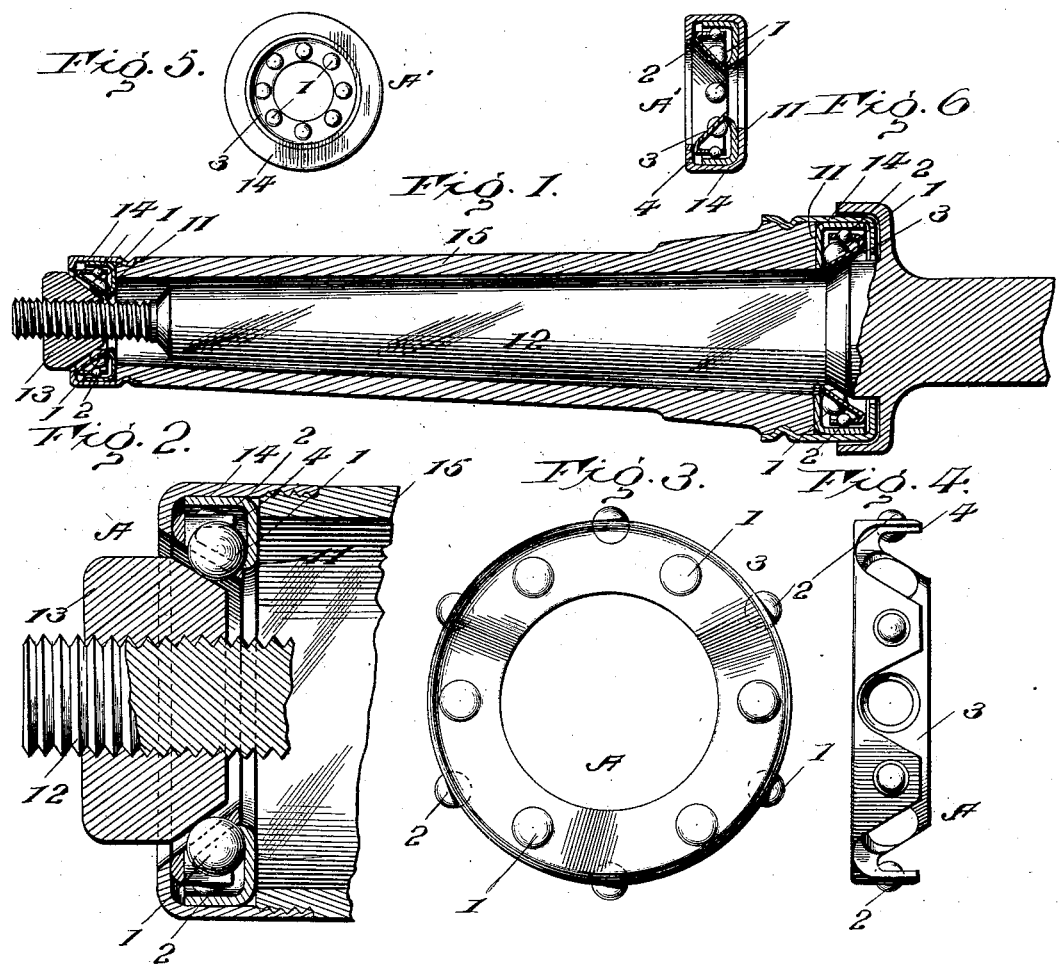
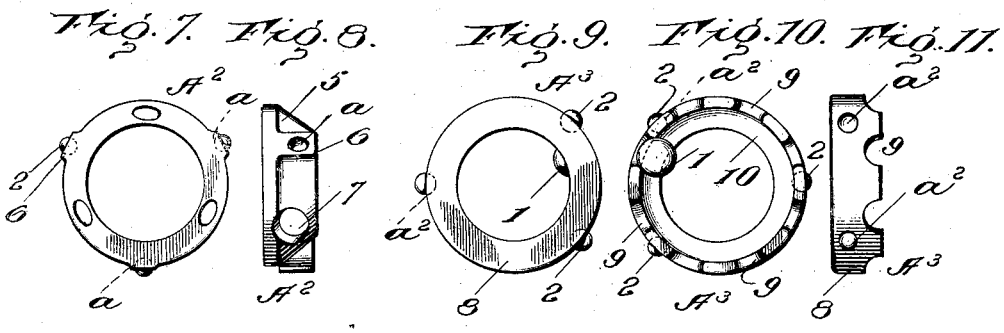
WITNESSES:
W. A. Williams
Jas A Richmond.
INVENTOR
Oliver C. Knipe.
BY
Augustus B. Stoughton Attorney No. 735,529. Patented August 4, 1903.

UNITED STATES PATENT OFFICE.

OLIVER C. KNIPE, OF NORRISTOWN, PENNSYLVANIA.

BALL-BEARING.

SPECIFICATION forming part of Letters Patent No. 735,529, dated August 4, 1903.

Application filed September 22, 1900. Serial No. 30,738. (No model.)

*To all whom it may concern:*

Be it known that I, OLIVER C. KNIPE, a citizen of the United States, residing at Norristown, Montgomery county, Pennsylvania, have invented certain new and useful Improvements in Ball-Bearings, of which the following is a specification.

One object of the present invention is to provide for keeping the retainer and spacer in central position in respect to the axis in order to improve the operation of the device and prevent binding or unnecessary rubbing of its parts.

Another object of the invention is to afford the retainer and spacer freedom of rotary motion. Other objects of the invention will appear from the following description.

The nature, characteristic features, and scope of my invention will be more fully understood from the following description, taken in connection with the accompanying drawings, forming part hereof, and in which—

Figure 1 is a sectional view illustrating a ball-bearing embodying features of my invention in application to a carriage or vehicle wheel. Fig. 2 is a similar view drawn to an enlarged scale and illustrating the left-hand end of the device shown in Fig. 1, with slight modifications. Figs. 3 and 4 are respectively a front and a side view of the retainer and spacer shown in Fig. 2. Figs. 5 and 6 are respectively a front and a sectional view showing a modified construction of the ball-race. Figs. 7 and 8 are a face and a side view of a spacer and retainer embodying a modification of the invention; and Figs. 9, 10, and 11 are face, rear, and side views of another modification of the invention.

In the drawings I have shown at A, Figs. 1 to 4; A', Figs. 5 and 6; A², Figs. 7 to 8, and at A³ in the remaining figures, ball-bearing spacers and retainers each having main bearing-balls 1 and also independent balls 2 for supporting the spacers and retainers independently of the main balls. Of course the spacer and retainer is susceptible of various modifications. As shown in Figs. 1 to 4, the spacer and retainer comprises a part 3 of the shape of a frustum of a cone. This part 3 is provided with openings, of which the edges are beveled and which receive the main balls 1. The part 3 is also provided with flanges 4, arranged cylindrically and each provided with an opening for the reception of the balls 2. In Figs. 5 and 6 the retainer and spacer A' is confined within a flanged cap 14, and the balls 1 and 2 run on raceways provided by the cup 11. As shown in Figs. 7 and 8, the conical part 5 is provided upon its exterior with recesses $a$, formed in projections 6 and adapted to receive the balls 2. The conical part itself is also provided with openings 7, which receive the main balls 1 and of which the edges may be properly beveled. As shown in Figs. 9, 10, and 11, the spacer and retainer A³ comprises a ring 8, having projections 9, so that it is, generally speaking, crown-shaped. If desired, it may be somewhat grooved, as at 10, and the main balls 1 occupy positions between the projections 9. The balls 2 are fitted in recesses $a^2$, formed upon the periphery of the ring-like part 8. The described spacer and retainer may be arranged for coöperation with a variety of ball-races, and I will proceed to describe those shown in the drawings.

11 is a cup having a ball-race upon which the main balls 1 are arranged to run. Of course these main balls also run upon conical tracks, which are shown as provisions of the axle 12 and of the nut 13. 14 is a cap fitted over the cup 11. This cap 14 may be secured to place in a variety of ways. As shown in Fig. 1, it is secured by means of a bead, which is fitted into a corresponding groove on the axle-box 15. In Fig. 2 the axle-box 15 and the cap 14 are connected by a thread. As shown in Figs. 5 and 6, the edge of the part 14 is flanged over the part 11, and thus the device is self-contained.

In use the main balls 1 run on the ball-race of the cup 11 and are held apart without undue restraint by the spacer and retainer. At the same time the balls 2 run on the inner rim of the cup 11 and keep the spacer in central position and at the same time afford it freedom of rotary motion.

It will be obvious to those skilled in the art to which my invention appertains that modifications may be made in details without departing from the spirit thereof. Hence I do not limit myself to the precise construction and arrangement of parts hereinabove set forth, and illustrated in the accompanying drawings; but,

Having thus described the nature and objects of my invention, what I claim as new, and desire to secure by Letters Patent, is—

1. A ball-retainer comprising an annulus having faces at angles to each other, one of said faces arranged for the separate and independent reception of main bearing-balls, and the other face for independent balls adapted to support the retainer independently of the main balls, substantially as described.

2. A ball-retainer comprising a cone-shaped annulus having openings for the reception of balls, and having a cylindrical flange provided with recesses for the reception of other balls, substantially as described.

3. A ball-retainer comprising a cone-shaped annulus provided with openings having inclined walls for the reception of balls, and having a cylindrical flange provided with recesses for the reception of smaller balls, substantially as described.

4. In combination, a bearing-cone, a cup having a ball-race, interposed bearing-balls, a ball-retainer comprising an annulus having openings for the reception of said balls and having recesses for the reception of other balls which serve to position the retainer, the balls in said recesses, and a cap which confines the retainer, balls and cup, substantially as described.

5. A ball-bearing comprising a cup having a ball-race, main balls arranged to run on said race, and a ball-retainer comprising an annulus, having spaced openings for the reception of the main balls, recesses for the reception of supporting-balls, and said supporting-balls, substantially as described.

6. A ball-bearing comprising a bearing-cone, a cup having a ball-race, interposed main bearing-balls, a ball-retainer comprising an annulus having faces at angles to each other, one of said faces arranged for the reception of main bearing-balls, and the other face for smaller balls adapted to support the retainer independently of the main balls, said smaller balls and a cap having its cylindrical walls fitted to the cylindrical walls of the cup, substantially as described.

7. In combination an axle-box having a groove, a cup having a ball-race, main balls arranged to run on said race, a ball-retainer having spaces for the reception of balls, independent balls arranged to run on said cup, and a cap sleeved onto said cup and having a bead fitted to said groove, substantially as described.

In testimony whereof I have hereunto signed my name.

OLIVER C. KNIPE.

In presence of—
W. J. JACKSON,
K. M. GILLIGAN.